(12) United States Patent
Wang et al.

(10) Patent No.: US 11,835,846 B2
(45) Date of Patent: Dec. 5, 2023

(54) CAMERA MODULE

(71) Applicant: SAMSUNG ELECTRO-MECHANICS CO., LTD., Suwon-si (KR)

(72) Inventors: Jin Sheng Wang, Suwon-si (KR); Cheong Hee Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/944,552

(22) Filed: Sep. 14, 2022

(65) Prior Publication Data
US 2023/0117691 A1    Apr. 20, 2023

(30) Foreign Application Priority Data
Oct. 15, 2021  (KR) .................. 10-2021-0137776

(51) Int. Cl.
*G03B 17/02*  (2021.01)
*G03B 17/55*  (2021.01)

(52) U.S. Cl.
CPC ............ *G03B 17/02* (2013.01); *G03B 17/55* (2013.01)

(58) Field of Classification Search
None
See application file for complete search history.

(56) References Cited

U.S. PATENT DOCUMENTS

| | | | |
|---|---|---|---|
| 2018/0246290 A1* | 8/2018 | Wang ................... | H04N 17/002 |
| 2019/0052782 A1 | 2/2019 | Sung et al. | |
| 2020/0007729 A1 | 1/2020 | Ha et al. | |
| 2020/0053258 A1* | 2/2020 | Park ....................... | H04N 23/51 |
| 2020/0116994 A1* | 4/2020 | Gu ......................... | G03B 17/55 |
| 2022/0196888 A1 | 6/2022 | Park et al. | |
| 2022/0236513 A1* | 7/2022 | Kim ....................... | G02B 7/021 |

FOREIGN PATENT DOCUMENTS

| | | |
|---|---|---|
| JP | 6827177 B2 | 2/2021 |
| KR | 10-2017-0094730 A | 8/2017 |
| KR | 10-2018-0038164 A | 4/2018 |
| KR | 10-2020-0001775 A | 1/2020 |
| KR | 10-2020-0053596 A | 5/2020 |
| KR | 10-2020-0114264 A | 10/2020 |
| KR | 10-2182272 B1 | 11/2020 |
| WO | WO 2019/076869 A1 | 4/2019 |

OTHER PUBLICATIONS

Korean Office Action dated Apr. 7, 2023, in counterpart Korean Patent Application No. 10-2021-0137776 (9 pages in English, 6 pages in Korean).

* cited by examiner

*Primary Examiner* — Rodney E Fuller
(74) *Attorney, Agent, or Firm* — NSIP Law

(57) ABSTRACT

A camera module includes a lens barrel comprising a lens; an upper housing, coupled to an end of the lens barrel, including an extension portion extending from an external surface of the lens barrel; a lower housing, coupled to the upper housing, configured to have an internal space; and a first substrate, disposed below the lens barrel, comprising an image sensor. A surface of the extension portion is bonded to the lens barrel, and another surface of the extension portion is bonded to the lower housing, and a shape of the first substrate corresponds to a shape of the internal space of the lower housing.

18 Claims, 8 Drawing Sheets

CAMERA MODULE

CROSS-REFERENCE TO RELATED APPLICATION(S)

This application claims the benefit under 35 USC 119(a) of Korean Patent Application No. 10-2021-0137776 filed on Oct. 15, 2021, in the Korean Intellectual Property Office, the entire disclosure of which is incorporated herein by reference for all purposes.

BACKGROUND

1. Field

The present disclosure relates to a camera module.

2. Description of Related Art

As components such as an iris (IRIS) and a heater become embedded in a vehicle's camera, camera functions have become increasingly complex.

In the automobile manufacturing industry, vehicle designs and component costs are important, and whether miniaturization can be realized at a low cost may be an important design factor. However, to realize a relatively high functionality, the size of a lens may need to be increased, and the structure may also become more complicated.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens barrel comprising a lens; an upper housing, coupled to an end of the lens barrel, including an extension portion extending from an external surface of the lens barrel; a lower housing, coupled to the upper housing, configured to have an internal space; and a first substrate, disposed below the lens barrel, comprising an image sensor. A surface of the extension portion is bonded to the lens barrel, and another surface of the extension portion is bonded to the lower housing, and a shape of the first substrate corresponds to a shape of the internal space of the lower housing.

The surface of the extension portion and the lens barrel may be bonded to each other by welding, and the other surface of the extension portion and the lower housing may be bonded to each other by welding.

A bonding protrusion or a bonding groove may be provided on the surface and the other surface of the extension portion. The lens barrel and the housing may include a bonding groove or a bonding protrusion coupled to the bonding protrusion or the bonding groove.

The lens barrel may further include a flange portion disposed opposite to the extension portion. The surface of the extension portion may be bonded to the flange portion.

A bonding region between the extension portion and the flange portion may have a ring shape.

A bonding region between the other surface of the extension portion and the lower housing may have a ring shape.

The camera module may further include an iris, disposed in the lens barrel, connected to the first substrate.

The end of the lens barrel may be configured to insert into a through-hole of the upper housing.

The upper housing may be formed of a laser-transmissive material.

In another general aspect, a camera module includes a lens barrel including a lens; a lens cap coupled to an end of the lens barrel; an upper housing, coupled to another end of the lens barrel, including an extension portion extending from an external surface of the lens barrel; a lower housing, coupled to the upper housing, configured to have an internal space; and a first substrate, disposed below the lens barrel, including an image sensor. A surface of the extension portion is bonded to the lens cap, and another surface of the extension portion is bonded to the lower housing. A shape of the first substrate corresponds to a shape of the internal space of the lower housing.

The camera module may further include a heater disposed between the lens barrel and the lens cap. The heater may be connected to the first substrate.

A bonding region between the surface of the extension portion and the lens cap may have a ring shape.

In another general aspect, a camera module includes: a lens barrel including a lens; a lens cap coupled to an end of the lens barrel; an upper housing coupled to another end of the lens barrel; a lower housing, coupled to the upper housing, configured to have an internal space; a first substrate, disposed below the lens barrel, including an image sensor; a second substrate, spaced apart from the first substrate, disposed in the internal space of the lower housing; a first bonding protrusion or a first bonding groove configured to bond with the upper housing is provided at an upper edge of the lower housing; and a second bonding groove or a second bonding protrusion corresponding to the first bonding protrusion or the first bonding groove is provided at a lower edge of the extension portion of the upper housing. An end of the lower housing has a hexahedral shape.

The first bonding protrusion and the second bonding groove may be bonded to each other by welding, and at least a portion of the first bonding protrusion may be melted and fill in at least a portion of the second bonding groove.

A gasket may be disposed between the upper housing and the lower housing.

The first bonding protrusion may have a height greater than a thickness of the gasket.

A material of the gasket may be undeformed by heat generated when the upper housing and the lower housing are assembled.

The first bonding protrusion may be configured to protrude past the gasket when the gasket is seated.

Other features and aspects will be apparent from the following detailed description, the drawings, and the claims.

BRIEF DESCRIPTION OF DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
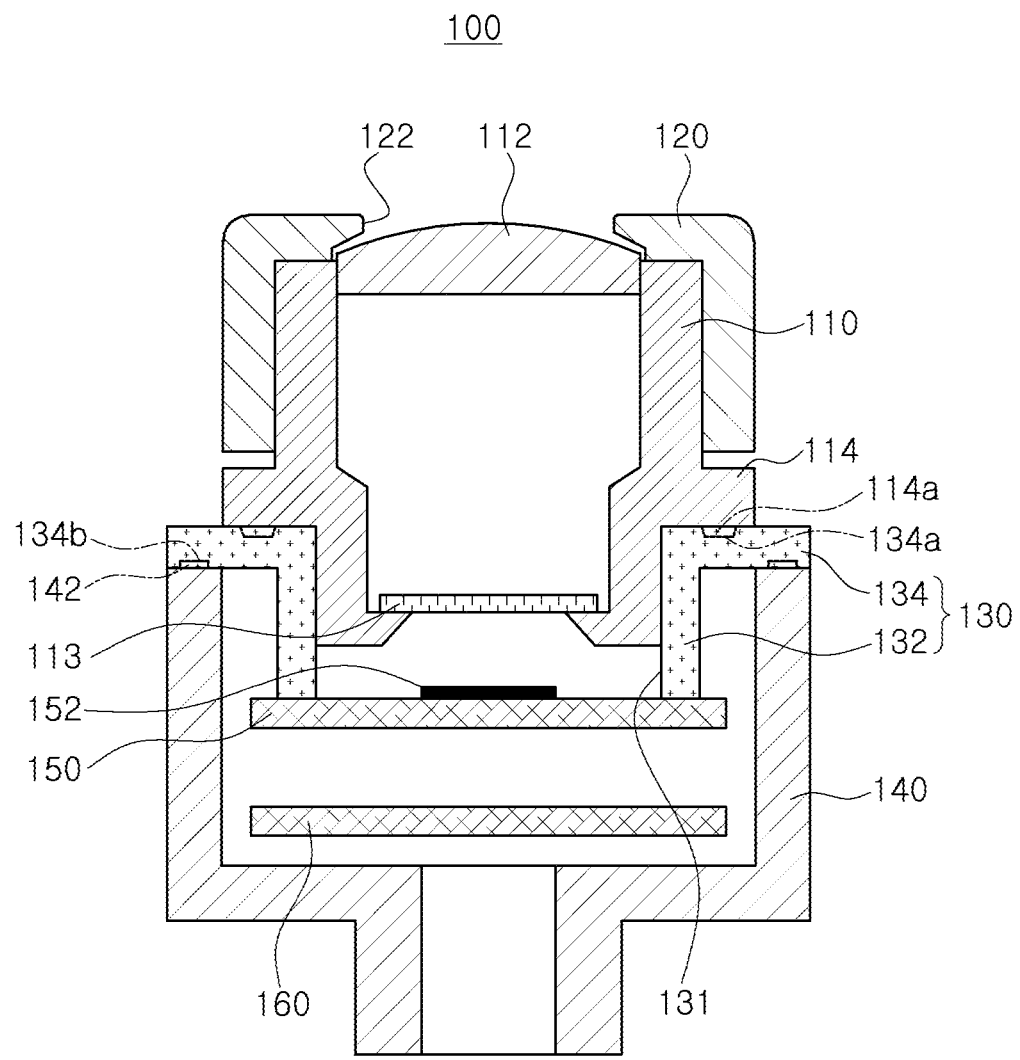
FIG. 1 is a cross-sectional diagram illustrating a camera module according to an example embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

An example embodiment of the present disclosure provides a camera module that may realize miniaturization and low costs.

FIG. 1 is a cross-sectional diagram illustrating a camera module according to an example embodiment.

Referring to FIG. 1, the camera module 100, according to an example embodiment, may include a lens barrel 110, a lens cap 120, an upper housing 130, a lower housing 140, a first substrate 150, and a second substrate 160.

At least one lens 112 may be installed in the lens barrel 110. As an example, the lens barrel 110 may have a cylindrical shape in which a plurality of lenses (not illustrated) are installed in an internal space thereof. Also, an IR filter 113 may be disposed on the lower end of the lens barrel 110. The lens barrel 110 may include a flange portion 114 for bonding with the upper housing 130, to be described later. For example, the flange portion 114 may extend from the external surface of the lens barrel 110. As an example, the flange portion 114 may have a circular ring shape or a square ring shape when viewed from above.

The flange portion 114 may include a first bonding protrusion 114a for bonding with the lens barrel 110. The first bonding protrusion 114a may have a ring shape that corresponds to the shape of the flange portion 114.

The lens cap 120 may be coupled to one end of the lens barrel 110. As an example, the lens cap 120 may be disposed to surround the upper end of the lens barrel 110, and an incident hole 122 may be formed in the upper surface such that light is incident to the lens barrel 110. As an example, the bottom surface of the lens cap 120 may be spaced apart from the flange portion 114 described above.

The upper housing 130 may be coupled to the other end of the lens barrel 110. The upper housing 130 may include a body 132 having a cylindrical shape in which a through-hole 131 is formed, and an extension portion 134 extending from an end of the body 132. Meanwhile, the upper housing 130 may be formed of a material through which laser light may pass. As an example, a first bonding groove 134*a* for bonding with the lens barrel 110 may be provided on one surface of the extension portion 134, and a second bonding groove 134*b* for bonding with the lower housing 140 may be provided on the other surface of the extension portion 134. Meanwhile, the second bonding groove 134*b* may be disposed on an outer side than the first bonding groove 134*a* in a radial direction.

As an example, the lens barrel 110 and the upper housing 130 may be bonded to each other by laser welding. That is, since the upper housing 130 is formed of a material that transmits laser light, when the laser beam is irradiated to the first bonding protrusion 114*a* in a state in which the first bonding protrusion 114*a* of the lens barrel 110 is disposed to be inserted into the first bonding groove 134*a*, the first bonding protrusion 114*a* may be melted and filled in the first bonding groove 134*a*. Accordingly, the lens barrel 110 and the upper housing 130 may be bonded and coupled to each other. Meanwhile, the first bonding groove 134*a* may have a ring shape corresponding to the first bonding protrusion 114*a*. As such, since the first bonding protrusion 114*a* has an annular shape and is inserted and welded into the first bonding groove 134*a*, it may not be desired to install a sealing member such as a separate O-ring. Accordingly, the number of components for sealing the lens barrel 110 and the upper housing 130 may be reduced.

The lower housing 140 may be coupled to the upper housing 130 and may have an internal space. As an example, the lower housing 140 may have a substantial box shape with an open upper portion. Meanwhile, a second bonding protrusion 142 inserted into the second bonding groove 134*b* may be provided on the upper surface of the lower housing 140. The second bonding protrusion 142 may have a ring shape corresponding to the shape of the upper surface of the lower housing 140 when viewed from above. As an example, the upper housing 130 and the lower housing 140 may be bonded to each other by laser welding. That is, since the upper housing 130 is formed of a material that may transmit laser light, when the laser beam is irradiated to the second bonding protrusion 142 in a state in which the second bonding protrusion 142 of the lower housing 140 is disposed to be inserted into the second bonding groove 134*b*, the second bonding protrusion 142 may be melted and filled in the second bonding groove 134*b*. Accordingly, the upper housing 130 and the lower housing 140 may be bonded and coupled to each other. Meanwhile, the second bonding groove 134*b* may have a ring shape corresponding to the second bonding protrusion 142. As described above, since the second bonding protrusion 142 having a ring shape is inserted and welded into the second bonding groove 134*b*, installing a sealing member such as a separate O-ring may not be desired. Accordingly, the number of components for sealing the upper housing 130 and the lower housing 140 may be reduced.

Since the upper housing 130 and the lower housing 140 are bonded by laser welding as described above, it may not be desired to install a fastening member such as a screw for coupling the upper housing 130 to the lower housing 140. Accordingly, the number of components for coupling the upper housing 130 to the lower housing 140 may be reduced.

Further, it may not be desired to install a fastening member such as a screw for coupling the upper housing 130 to the lower housing 140, the size of the first and second substrates 150 and 160 disposed in the internal space of the lower housing 140 may be increased.

The first substrate 150 may be disposed below the lens barrel 110 and may include an image sensor 152. As an example, the first substrate 150 may be installed to be fixed to the upper housing 130 so as to be disposed in the internal space of the lower housing 140. Also, light passing through the plurality of lenses installed in the lens barrel 110 may be incident to the image sensor 152 provided on the first substrate 150.

The second substrate 160 may be spaced apart from the first substrate 150, and may be disposed in the internal space of the lower housing 140. As an example, the second substrate 160 may be installed to be fixed to the lower housing 140 by screws. Meanwhile, the second substrate 160 may work as a substrate for supplying power to the camera module 100.

As described above, since the lens barrel 110 and the lower housing 140 are bonded to the upper housing 130 by laser welding, the number of portions may be reduced. Accordingly, manufacturing costs may be reduced.

Further, the sizes of the first and second substrates 150 and 160 may be increased.

Hereinafter, a method of manufacturing a camera module according to an example embodiment will be described with reference to the drawings.

Figure 2:
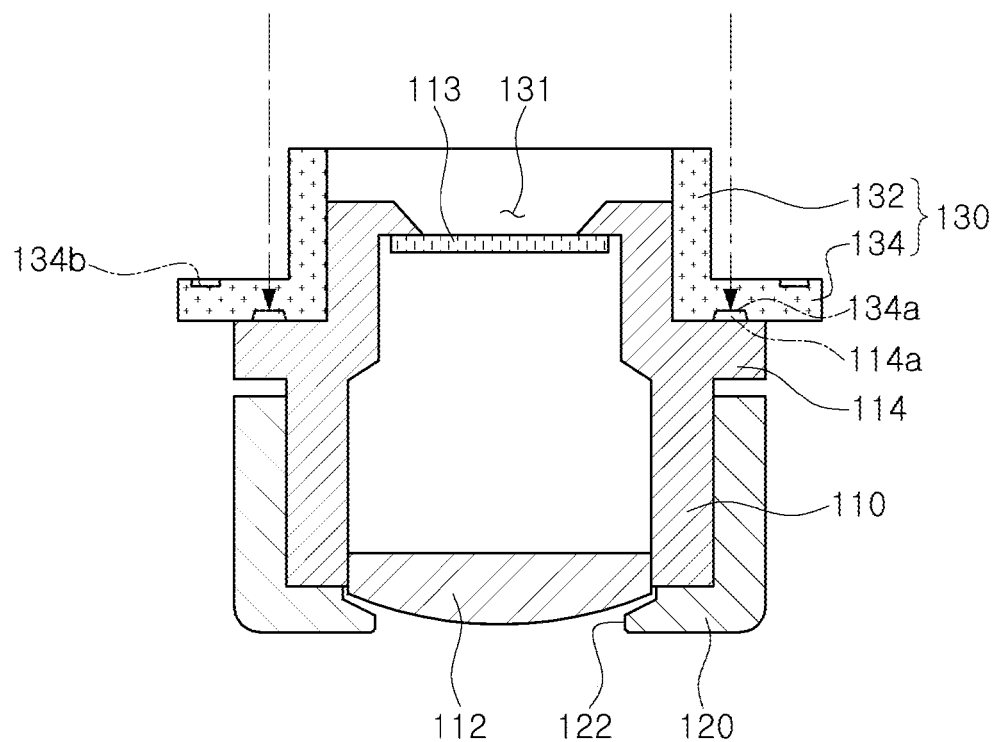
FIG. 2 is a diagram illustrating a process of assembling a lens barrel and an upper housing of a camera module according to an example embodiment of the present disclosure.
Figure 3:
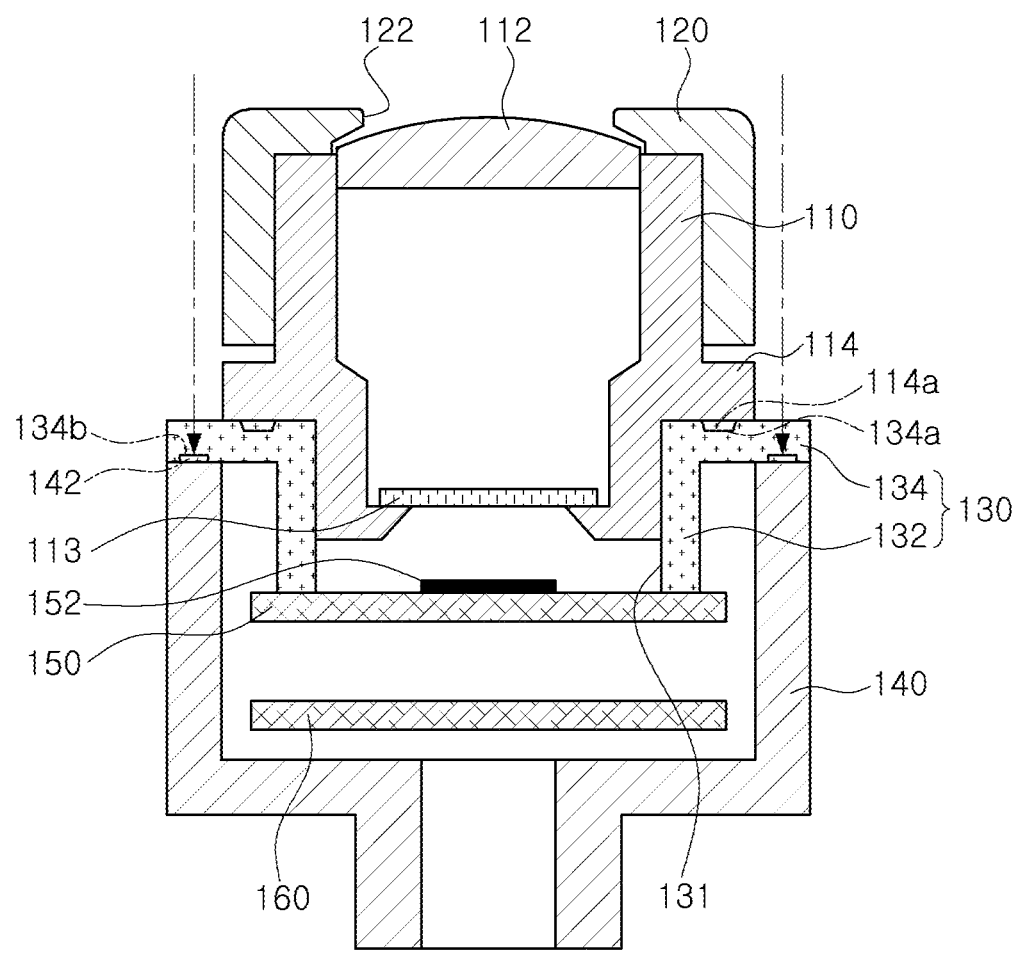
FIG. 3 is a diagram illustrating a process of assembling an upper housing and a lower housing of a camera module according to an example embodiment of the present disclosure.

FIG. 2 is a diagram illustrating a process of assembling a lens barrel and an upper housing of a camera module according to an example embodiment. FIG. 3 is a diagram illustrating a process of assembling an upper housing and a lower housing of a camera module according to an example embodiment.

Referring to FIG. 2, the upper housing 130 may be seated on the upper portion of the lens barrel 110 in a state in which the lens barrel 110 is assembled while the lens cap 120 is disposed in the lower portion. In this case, the first bonding protrusion 114*a* of the lens barrel 110 may be disposed to be inserted into the first bonding groove 134*a* of the upper housing 130. Thereafter, the laser beam may be irradiated to the first bonding protrusion 114*a*. In this case, since the upper housing 130 is formed of a material that may transmit laser light, laser light may be irradiated to the first bonding protrusion 114*a*.

Accordingly, the first bonding protrusion 114*a* may be bonded to the first bonding groove 134*a* by welding, such that the lens barrel 110 may be bonded to the upper housing 130.

Thereafter, as illustrated in FIG. 3, the upper housing 130 and the lower housing 140 may be assembled after the assembly and optical axis adjustment of the first and second substrates 150 and 160 are completed. In this case, laser welding may also bond the upper housing 130 and the lower housing 140. That is, since the upper housing 130 is formed of a material that may transmit laser light, even when laser light is irradiated in the upper portion of the upper housing 130, laser light may be irradiated to the second bonding protrusion 142 of the lower housing 140. Accordingly, the second bonding protrusion 142 may be melted in the second bonding groove 134*b* and may be bonded to the second bonding groove 134*b* by welding.

Meanwhile, since the first bonding protrusion 142 and the first bonding protrusion 114*a* have a ring shape, a sealing member such as an O-ring may not be installed. Further, since the upper housing 130 and the lower housing 140 may not be coupled by fastening by screws, the issue due to the loosening of the screws may also be addressed.

Figure 4:
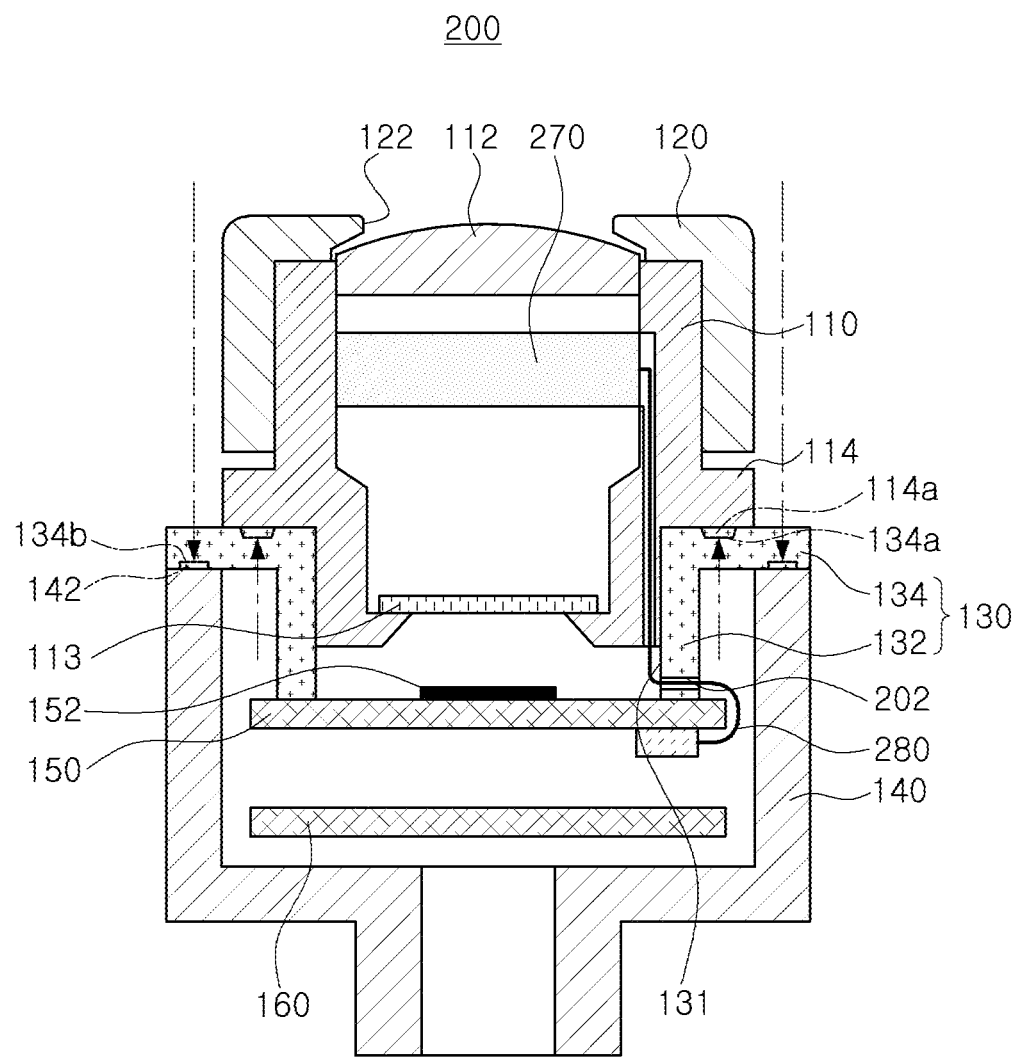
FIG. 4 is a cross-sectional diagram illustrating a camera module according to an example embodiment of the present disclosure.

FIG. 4 is a cross-sectional diagram illustrating a camera module according to an example embodiment.

Referring to FIG. 4, the camera module 200, according to another example embodiment, may include a lens barrel 110, a lens cap 120, an upper housing 130, a lower housing 140, a first substrate 150, a second substrate 160, and an iris 270.

The descriptions of the lens barrel 110, the lens cap 120, the upper housing 130, the lower housing 140, the first substrate 150, and the second substrate 160 may be substantially the same as the descriptions described in the aforementioned example embodiment other than the components related to the iris 270, and therefore a detailed description thereof may not be provided.

The iris 270 may be installed in the internal space of the lens barrel 110. Meanwhile, the iris 270 may be electrically connected to the first substrate 150 through the cable 280, and to this end, the lens barrel 110 may include an installation hole 202 in which the cable 280 is installed. Also, as described above, the lens barrel 110 may be bonded to the upper housing 130 by laser welding. Accordingly, the cable 280 may not need to rotate together with the lens barrel 110, such that the process of assembling the lens barrel 110 and the upper housing 130 may be performed easily. In other words, generally, a screw portion formed in the lens barrel 110 may be coupled to the screw portion formed in the upper housing 130 by screw fastening. Accordingly, when the lens barrel 110 is assembled to the upper housing 130, the lens barrel 110 may need to rotate to be coupled to the upper housing 130. Accordingly, when the iris 270 is installed in the lens barrel 110, the cable 280 may also need to rotate and to be coupled to the lens barrel 110, such that the structure of the lens barrel 110 may be complicated. However, since the lens barrel 110 is bonded and installed to the upper housing 130 by laser welding, only a pin (not illustrated) which may simply fix the position of the cable 280 for installation of the cable 280 may be employed. Accordingly, even when the iris 270 is employed, miniaturization and cost reduction may be realized.

Figure 5:
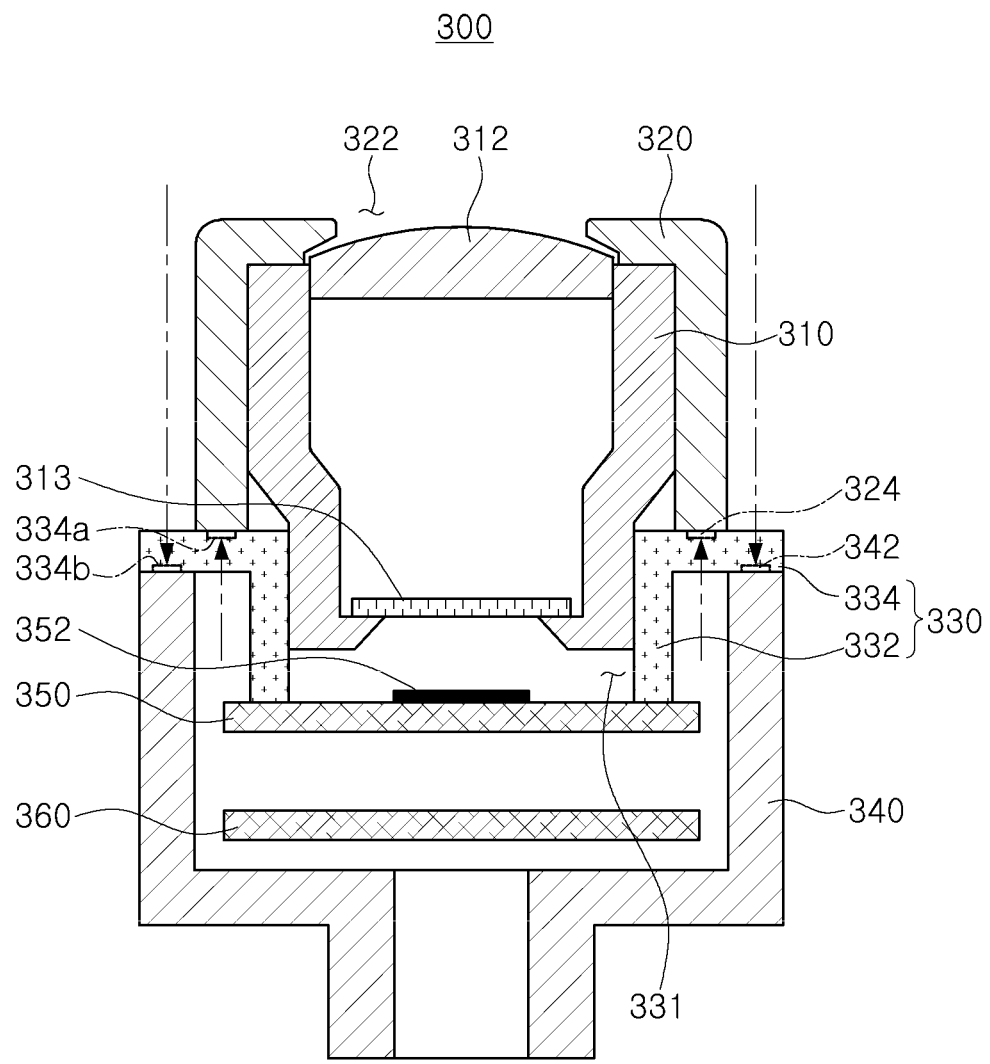
FIG. 5 is a cross-sectional diagram illustrating a camera module according to another example embodiment of the present disclosure.

FIG. 5 is a cross-sectional diagram illustrating a camera module according to another example embodiment.

Referring to FIG. 5, the camera module 300, according to another example embodiment, may include a lens barrel 310, a lens cap 320, an upper housing 330, a lower housing 340, a first substrate 350, and a second substrate 360.

At least one lens 312 may be installed in the lens barrel 310. As an example, the lens barrel 310 may have a cylindrical shape in which a plurality of lenses (not illustrated) are installed in the internal space thereof. Also, an IR filter 313 may be disposed on a lower end of the lens barrel 310.

The lens cap 320 may be coupled to one end of the lens barrel 310. As an example, the lens cap 320 may be disposed to surround the upper end of the lens barrel 310, and an incident hole 322 may be formed in the upper surface such that light may be incident to the lens barrel 310.

Meanwhile, a first bonding protrusion 324 for bonding with the upper housing 330 may be provided on the bottom surface of the lens cap 320. The first bonding protrusion 324 may have a ring shape to correspond to the shape of the extension portion 334 of the upper housing 330, which will be described later.

The upper housing 330 may be coupled to the other end of the lens barrel 310. Meanwhile, the upper housing 330 may include a body 332 having a cylindrical shape in which a through-hole 331 is formed, and an extension portion 334 extending from an end of the body 332. Meanwhile, the upper housing 330 may be formed of a material that transmits laser light. As an example, a first bonding groove 334a for bonding with the lens cap 320 may be provided in one surface of the extension portion 334, and a second bonding groove 334b for bonding with the lower housing 340 may be provided in the other surface of the extension portion 334. Meanwhile, the second bonding groove 334b may be disposed on an outer side than the first bonding groove 334a in a radial direction.

As an example, the lens cap 320 and the upper housing 330 may be bonded to each other by laser welding. That is, since the upper housing 330 is formed of a material that may transmit laser light, when a laser beam is irradiated to the first bonding protrusion 324 in a state in which the lens cap 320 and the first bonding protrusion 324 are disposed to be inserted into the first bonding groove 334a, the first bonding protrusion 324 may be melted and filled in the first bonding groove 334a. Accordingly, the lens cap 320 and the upper housing 330 may be bonded and coupled to each other. Meanwhile, the first bonding groove 334a may have a ring shape corresponding to the first bonding protrusion 324. As described above, since the first bonding protrusion 324 having a ring shape is welded and inserted into the first bonding groove 334a, it may not be desired to install a sealing member such as a separate O-ring. Accordingly, the number of components for sealing the lens cap 320 and the upper housing 330 may be reduced.

The lower housing 340 may be coupled to the upper housing 330 and may have an internal space. As an example, the lower housing 340 may have a substantial box shape with an open upper portion. Meanwhile, a second bonding protrusion 342 inserted into the second bonding groove 334b may be provided on the upper surface of the lower housing 340. The second bonding protrusion 342 may have a ring shape corresponding to the shape of the upper surface of the lower housing 340 when viewed from above. As an example, the upper housing 330 and the lower housing 340 may be bonded to each other by laser welding. That is, since the upper housing 330 is formed of a material that may transmit laser light, when the laser beam is irradiated to the second bonding protrusion 342 in a state in which the second bonding protrusion 342 of the lower housing 340 is disposed to be inserted into the second bonding groove 334b, the second bonding protrusion 342 may be melted and filled in the second bonding groove 334b. Accordingly, the upper housing 330 and the lower housing 340 may be bonded and coupled with each other. Meanwhile, the second bonding groove 334b may have a ring shape corresponding to the second bonding protrusion 342. As described above, since the second bonding protrusion 342 has an annular shape and is inserted and welded into the second bonding groove 334b, it may not be desired to install a sealing member such as a separate O-ring. Accordingly, the number of components for sealing the upper housing 330 and the lower housing 340 may be reduced.

Since the upper housing 330 and the lower housing 340 are bonded by laser welding as described above, it may not be desired to install a fastening member such as a screw for coupling the upper housing 330 and the lower housing 340. Accordingly, the number of components for coupling the upper housing 330 and the lower housing 340 may be reduced.

Further, since it may not be desired to install a fastening member such as a screw for coupling the upper housing 330 and the lower housing 340, the size of the first and second substrates 350 and 360 disposed in the internal space of the lower housing 340 may be increased.

The first substrate 350 may be disposed below the lens barrel 310 and may include an image sensor 352. As an example, the first substrate 350 may be installed to be fixed to the upper housing 330 to be disposed in the internal space of the lower housing 340. Also, light passing through the plurality of lenses installed in the lens barrel 310 may be incident to the image sensor 352 provided on the first substrate 350.

The second substrate 360 may be spaced apart from the first substrate 350, and may be disposed in the internal space of the lower housing 340. As an example, the second substrate 360 may be installed to be fixed to the lower housing 340 by screws. Meanwhile, the second substrate 360 may work as a substrate for supplying power to the camera module 300.

As described above, since the lens cap 320 and the lower housing 340 are bonded to the upper housing 330 by laser welding, the number of portions may be reduced. Accordingly, manufacturing costs may be reduced.

Further, the size of the first and second substrates 350 and 360 may be increased.

Figure 6:
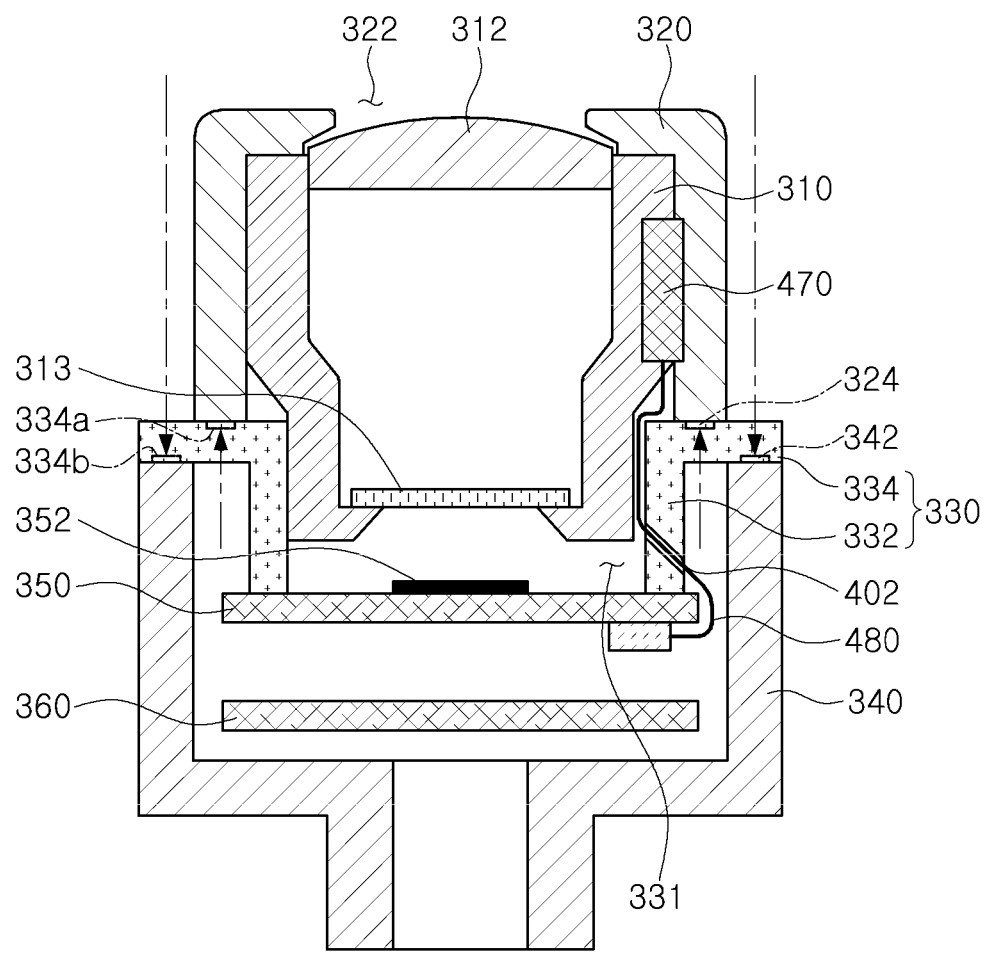
FIG. 6 is a cross-sectional diagram illustrating a camera module according to another example embodiment of the present disclosure.

FIG. 6 is a cross-sectional diagram illustrating a camera module according to another example embodiment.

Referring to FIG. 6, the camera module 400, according to another example embodiment, may include a lens barrel 310, a lens cap 320, an upper housing 330, a lower housing 340, a first substrate 350, a second substrate 360, and a heater 470.

The descriptions of the lens barrel 310, the lens cap 320, the upper housing 330, the lower housing 340, the first substrate 350, and the second substrate 360 may be substantially the same as the descriptions described in the aforementioned example embodiment other than the components related to the heater 470, and therefore a detailed description thereof may not be provided.

The heater 470 may be disposed between the lens barrel 310 and the lens cap 320. Meanwhile, the heater 470 may be electrically connected to the first substrate 350 through the cable 480, and to this end, the upper housing 330 may include an installation hole 402 in which the cable 480 is installed. Meanwhile, as described above, the lens cap 320 may be bonded to the upper housing 330 by laser welding. Accordingly, the cable 480 may not need to rotate together with the lens barrel 310, such that the process of assembling the lens barrel 310 and the upper housing 330 may be performed easily. Specifically, generally, a screw portion formed in the lens barrel 310 may be coupled to the screw portion formed in the upper housing 330 by screw fastening. Accordingly, when the heater 470 is installed in the lens barrel 310, the cable 480 may also need to be coupled while rotating together, such that the structure of the lens barrel 310 may be complicated. However, since the lens cap 320 to which the lens barrel 310 is assembled is bonded to the upper housing 330 by laser welding, only a pin (not illustrated) which may simply fix the position of the cable 480 for installation of the cable 480 may be employed. Accordingly, even when the heater 470 is employed, miniaturization and cost reduction may be realized.

Figure 7:
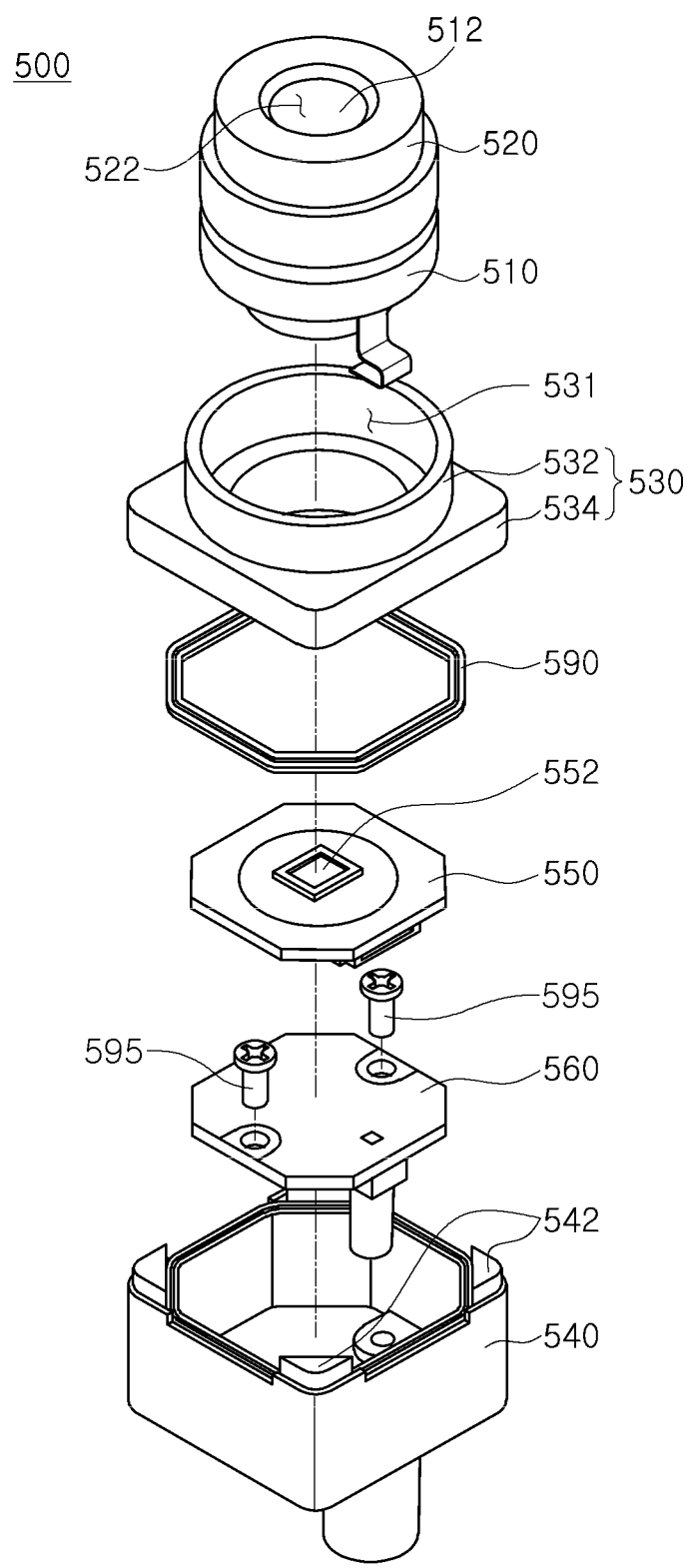
FIG. 7 is an exploded perspective diagram illustrating a camera module according to another example embodiment of the present disclosure.
Figure 8:
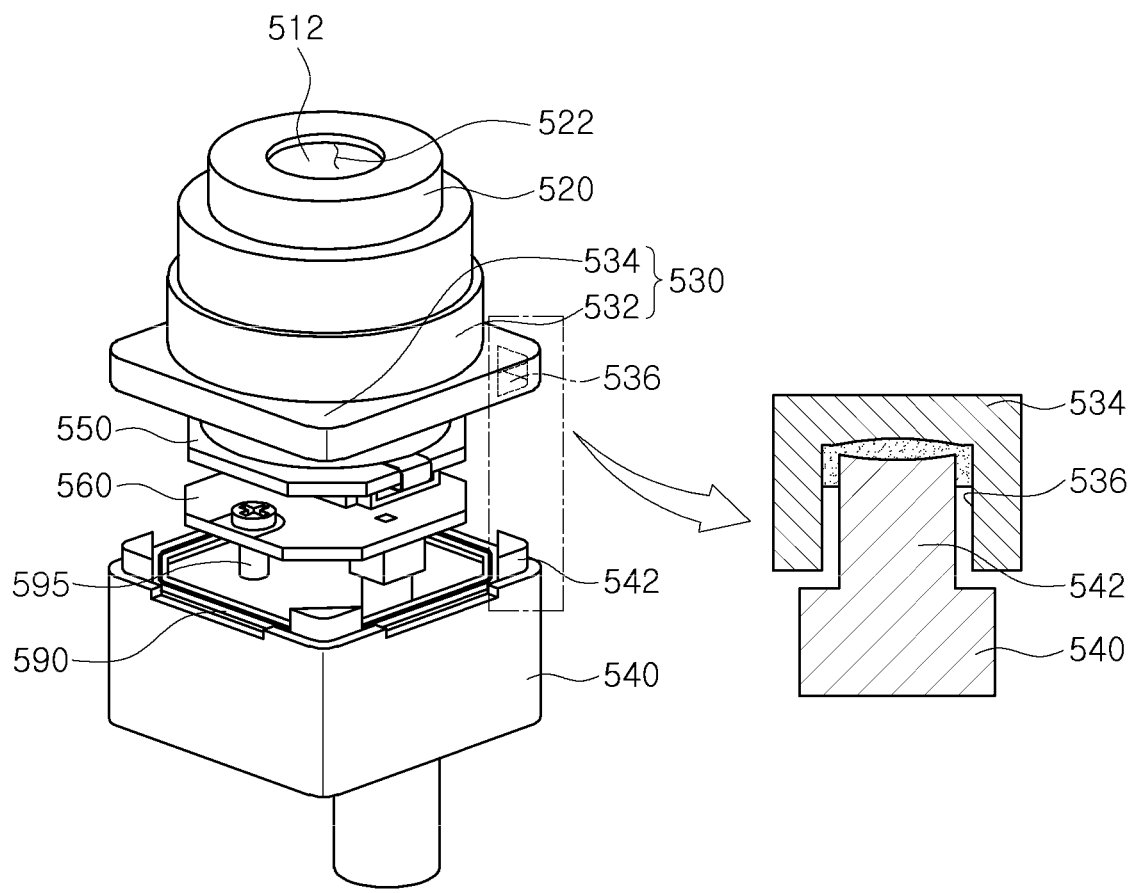
FIG. 8 is a diagram illustrating a process of assembling an upper case and a lower case of a camera module according to an example embodiment of the present disclosure.

FIG. 7 is an exploded perspective diagram illustrating a camera module according to another example embodiment. FIG. 8 is a diagram illustrating a process of assembling an upper case and a lower case of a camera module according to an example embodiment.

Referring to FIGS. 7 and 8, the camera module 500, according to another example embodiment, may include a lens barrel 510, a lens cap 520, an upper housing 530, a lower housing 540, a first substrate 550, and a second substrate 560.

At least one lens 512 may be installed in the lens barrel 510. As an example, the lens barrel 510 may have a cylindrical shape in which a plurality of lenses (not illustrated) are installed in an internal space thereof. Also, an IR filter 114 (see FIG. 1) may be disposed on a lower end of the lens barrel 510.

The lens cap 520 may be coupled to one end of the lens barrel 510. As an example, the lens cap 520 may be disposed to surround the upper end of the lens barrel 510, and an incident hole 522 may be formed in the upper surface such that light is incident to the lens barrel 510.

The upper housing 530 may be coupled to the other end of the lens barrel 510. Meanwhile, the upper housing 530 may include a body 532 having a cylindrical shape in which a through-hole 531 is formed, and an extension portion 534 extending from an end of the body 532. Meanwhile, the upper housing 530 may be formed of a material that transmits laser light. As an example, bonding grooves 536 for bonding with the lower housing 540 may be provided on a lower surface of the extension portion 534.

Meanwhile, the lens barrel 510 and the upper housing 530 may be assembled by various methods. As an example, the lens barrel 510 and the upper housing 530 may be assembled by fastening a screw portion, or may be assembled by bonding by laser welding. That is, the method of assembling the lens barrel 510 and the upper housing 530 may be varied.

The lower housing 540 may be coupled to the upper housing 530 and may have an internal space. As an example, the lower housing 540 may have a substantial box shape with an open upper portion. Meanwhile, bonding protrusions 542 inserted into the bonding grooves 536 may be provided on the upper surface of the lower housing 540. The bonding protrusions 542 may be disposed near the edge of the upper surface of the lower housing 540 when viewed from above, and four bonding protrusions 542 may be spaced apart from each other. As an example, the upper housing 530 and the lower housing 540 may be bonded to each other by laser welding. That is, since the upper housing 530 is formed of a material that may transmit laser light, when the laser beam is irradiated to the bonding protrusions 542 in a state in which the bonding protrusions 542 of the lower housing 540 are disposed to be inserted into the bonding grooves 536, at least a portion of the bonding protrusions 542 may be melted and filled in at least a portion of the bonding grooves 536. Accordingly, the upper housing 530 and the lower housing 540 may be bonded and coupled to each other. Meanwhile, four bonding grooves 536 may be disposed near the edge of the extension portion 534 to correspond to the bonding protrusions 542 and may be spaced apart from each other.

Meanwhile, since a portion of the upper housing 530 and the lower housing 540 is bonded by welding, a gasket 590 may be installed between the upper housing 530 and the lower housing 540. As an example, the gasket 590 may have a thickness smaller than the height of the bonding protrusions 542. Also, in order to prevent deformation of the gasket 590 due to the heat generated when the bonding protrusions 542 are welded to the bonding grooves 536 by laser welding, the gasket 590 may be formed of a material that may be prevented from being deformed.

Since the upper housing 530 and the lower housing 540 are bonded by laser welding as described above, it may not be desired to install a fastening member such as a screw for coupling the upper housing 530 and the lower housing 540. Accordingly, the number of components for coupling the upper housing 530 and the lower housing 540 may be reduced.

Further, since it may not be desired to install a fastening member such as a screw for coupling the upper housing 530 and the size of the first and second substrates 550 and 560 disposed in the internal space of the lower housing 540 may be increased.

The first substrate 550 may be disposed below the lens barrel 510 and may include an image sensor 552. As an example, the first substrate 550 may be installed to be fixed to the upper housing 530 to be disposed in the internal space of the lower housing 540. Also, the light passing through the plurality of lenses installed in the lens barrel 510 may be incident to the image sensor 552 provided on the first substrate 550.

The second substrate 560 may be spaced apart from the first substrate 550, and may be disposed in the internal space of the lower housing 540. As an example, the second substrate 560 may be installed to be fixed to the lower housing 540 by screws 595. Meanwhile, the second substrate 560 may work as a substrate for supplying power to the camera module 500.

As described above, since the lower housing 540 is bonded to the upper housing 530 by laser welding, and the lens barrel 510 may also be bonded to the upper housing 530 by laser welding, the number of components may be reduced. Accordingly, manufacturing costs may be reduced.

Furthermore, the sizes of the first and second substrates 550 and 560 may be increased.

According to the aforementioned example embodiments, the effect of reducing the number of components and implementing miniaturization and cost reduction may be obtained.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a lens barrel comprising a lens;
   an upper housing coupled to an end of the lens barrel and comprising a body portion, and an extension portion extending from an end of the body portion;
   a lower housing coupled to the upper housing and having an internal space; and
   a first substrate disposed below the lens barrel and comprising an image sensor,
   wherein a first surface of the extension portion is bonded to the lens barrel, and a second surface of the extension portion is bonded to the lower housing,
   the first surface of the extension portion and the second surface of the extension portion are disposed on opposite sides of the extension portion, and
   a shape of the first substrate corresponds to a shape of the internal space of the lower housing.

2. The camera module of claim 1, wherein the first surface of the extension portion is welded to the lens barrel, and the second surface of the extension portion is welded to the lower housing.

3. The camera module of claim 1, wherein the first surface of the extension portion comprises a first bonding groove, the second surface of the extension portion comprises a second bonding groove, the lens barrel comprises a first bonding protrusion bonded to the first bonding groove, and the lower housing comprises a second bonding protrusion bonded to the second bonding groove, or
   the first surface of the extension portion comprises a first bonding protrusion, the second surface of the extension portion comprises a second bonding protrusion, the lens barrel comprises a first bonding groove bonded to the first bonding protrusion, and the lower housing comprises a second bonding groove bonded to the second bonding protrusion.

4. The camera module of claim 1, wherein the lens barrel further comprises a flange portion opposing the extension portion, and
   the first surface of the extension portion is bonded to the flange portion.

5. The camera module of claim 4, wherein a bonding region between the first surface of the extension portion and the flange portion has a ring shape.

6. The camera module of claim 1, wherein a bonding region between the second surface of the extension portion and the lower housing has a ring shape.

7. The camera module of claim 1, further comprising an iris disposed in the lens barrel and connected to the first substrate.

8. The camera module of claim 1, wherein the end of the lens barrel is inserted into a through-hole in the upper housing.

9. The camera module of claim 1, wherein the upper housing is made of a material that transmits laser light.

10. A camera module comprising:
    a lens barrel comprising a lens;
    a lens cap coupled to a first end of the lens barrel;
    an upper housing coupled to a second end of the lens barrel and comprising a body portion, and an extension portion extending from an end of the body portion;
    a lower housing coupled to the upper housing and having an internal space; and
    a first substrate disposed below the lens barrel and comprising an image sensor,
    wherein a first surface of the extension portion is bonded to the lens cap, and a second surface of the extension portion is bonded to the lower housing,
    the first surface of the extension portion and the second surface of the extension portion are disposed on opposite sides of the extension portion, and
    a shape of the first substrate corresponds to a shape of the internal space of the lower housing.

11. The camera module of claim 10, further comprising a heater disposed between the lens barrel and the lens cap and connected to the first substrate.

12. The camera module of claim 10, wherein a bonding region between the first surface of the extension portion and the lens cap has a ring shape.

13. A camera module comprising:
a lens barrel comprising a lens;
a lens cap coupled to a first end of the lens barrel;
an upper housing coupled to a second end of the lens barrel and comprising a body portion, and an extension portion extending from an end of the body portion;
a lower housing coupled to the upper housing and having an internal space;
a first substrate disposed below the lens barrel and comprising an image sensor; and
a second substrate spaced apart from the first substrate and disposed in the internal space of the lower housing,
wherein an end of the lower housing has a hexahedral shape,
a first surface of the extension portion is bonded to the lens barrel, and a second surface of the extension portion is bonded to the lower housing,
the first surface of the extension portion and the second surface of the extension portion are disposed on opposite sides of the extension portion, and
the first surface of the extension portion comprises a first bonding groove, the second surface of the extension portion comprises a second bonding groove, the lens barrel comprises a first bonding protrusion bonded to the first bonding groove, and the lower housing comprises a second bonding protrusion bonded to the second bonding groove, or the first surface of the extension portion comprises a first bonding protrusion, the second surface of the extension portion comprises a second bonding protrusion, the lens barrel comprises a first bonding groove bonded to the first bonding protrusion, and the lower housing comprises a second bonding groove bonded to the second bonding protrusion.

14. The camera module of claim 13, wherein the second bonding protrusion of the lower housing is welded to the second bonding groove of the second surface of the extension portion, and
at least a portion of the second bonding protrusion of the lower housing is melted and fills in at least a portion of the second bonding groove of the second surface of the extension portion.

15. The camera module of claim 14, further comprising a gasket disposed between the upper housing and the lower housing.

16. The camera module of claim 15, wherein a height of the second bonding protrusion of the lower housing is greater than a thickness of the gasket.

17. The camera module of claim 15, wherein the gasket is made of a material that is not deformed by heat generated when the second bonding protrusion of the lower housing is welded to the second bonding groove of the second surface of the extension portion.

18. The camera module of claim 15, wherein the second bonding protrusion of the lower housing protrudes past the gasket while the gasket is disposed between the upper housing and the lower housing.

* * * * *